United States Patent [19]

Corder

[11] Patent Number: 5,106,145
[45] Date of Patent: Apr. 21, 1992

[54] CONVERTIBLE STACK SYSTEM

[75] Inventor: George A. Corder, Romulus, Mich.

[73] Assignee: ASC Incorporated, Southgate, Mich.

[21] Appl. No.: 648,278

[22] Filed: Jan. 31, 1991

[51] Int. Cl.$^5$ ............................................. B60J 7/12
[52] U.S. Cl. ................................... 296/107; 296/108; 296/116; 296/121
[58] Field of Search ............... 296/107, 108, 121, 116, 296/117, 118

[56] References Cited

U.S. PATENT DOCUMENTS

| | | | |
|---|---|---|---|
| 3,994,524 | 11/1976 | Lehmann | 296/107 |
| 4,573,732 | 3/1986 | Muscat | 296/108 |
| 4,778,215 | 10/1988 | Ramaciotti | 296/107 |
| 4,828,317 | 5/1989 | Muscat | 296/122 |
| 4,984,841 | 1/1991 | Bauer et al. | 296/118 |
| 5,004,291 | 4/1991 | Bauer et al. | 296/166 |

FOREIGN PATENT DOCUMENTS

| | | | |
|---|---|---|---|
| 1382298 | 11/1964 | France | 296/107 |
| 727661 | 4/1955 | United Kingdom | 296/107 |

*Primary Examiner*—Robert R. Song
*Attorney, Agent, or Firm*—Harness, Dickey & Pierce

[57] ABSTRACT

A convertible top having means for tensioning the convertible top pliable covering means and for reducing the distance between the convertible top and a vehicle body panel, thereby defining the exterior finished surface of the vehicle at a location where the body panel and the convertible top are adjacent. To accomplish this, the convertible top utilizes a member coupled to the convertible top linkage assembly that is displaced outwardly by a camming means. The method of outwardly displacing this member involves the first step of raising the convertible top to an intermediate raised portion. The next step is raising the convertible top further such that the member engages a camming means and is displaced outwardly. Finally, the last step is bringing the convertible top to an operative position where it covers the interior of the vehicle.

36 Claims, 4 Drawing Sheets

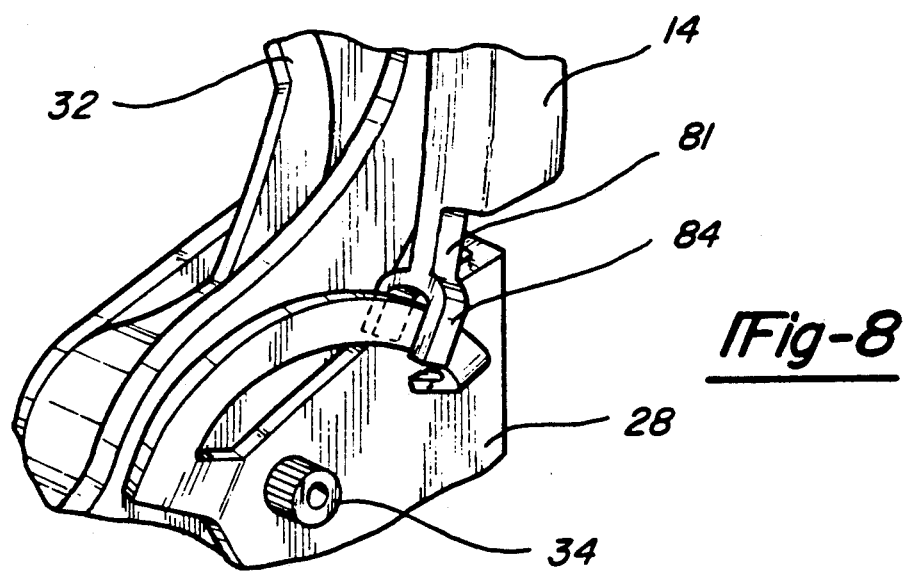

CONVERTIBLE STACK SYSTEM

BACKGROUND OF THE INVENTION

This invention relates generally to convertible top linkage mechanisms and more particularly to a unique mechanism which when retracted has a relatively narrow transverse dimension in order to facilitate storage in a rearwardly converging vehicle body opening and yet when raised is capable of tensioning the convertible top pliable covering by outwardly displacing it toward the body side panels to provide a finished substantially flush appearance.

In general, convertible tops are comprised of a linkage assembly which supports a pliable covering material. The linkage assembly is pivotally coupled to the vehicle such that the convertible top can be retracted and stored in an onboard relatively narrow storage compartment. When erecting a convertible top, it is desirous to have the top positioned as close as possible to the body panels, thereby avoiding unsightly gaps between the panels and the top. Accordingly, convertible tops exist that displace outwardly when raised, and inwardly when lowered. This creates a more aesthetic appearance when the top is in a raised position, and provides clearance between the body panels and the convertible top when it is lowered.

An example of this type of convertible top is generally disclosed in U.S. patent application Ser. No. 300,497, however, it should be noted that these types of convertible tops are relatively complex, requiring many parts such as cams, control links, and bell-cranks to accomplish the desired task. Thus, it is an object of the present invention to provide an improved means for laterally displacing a convertible top, as it is being raised and lowered, that is simpler and more effective than existing designs. It is another object of the present invention to provide a means for displacing a convertible top, as it is raised and lowered, that is reliable, simple and capable of being manufactured consistently and at a low cost and which minimizes fabric wear by substantially eliminating rubbing against body quarter trim. These and other advantages of the present invention will become apparent from the subsequent description and the claims taken in conjunction with the accompanying drawings.

BRIEF DESCRIPTION OF THE DRAWINGS

FIG. 8 is a perspective view of the camming means, showing a alternative fork shaped follower for engaging both the inboard and outboard surfaces of the ramped portion of the camming means.

BRIEF DESCRIPTION OF THE PREFERRED EMBODIMENT

Figure 1:
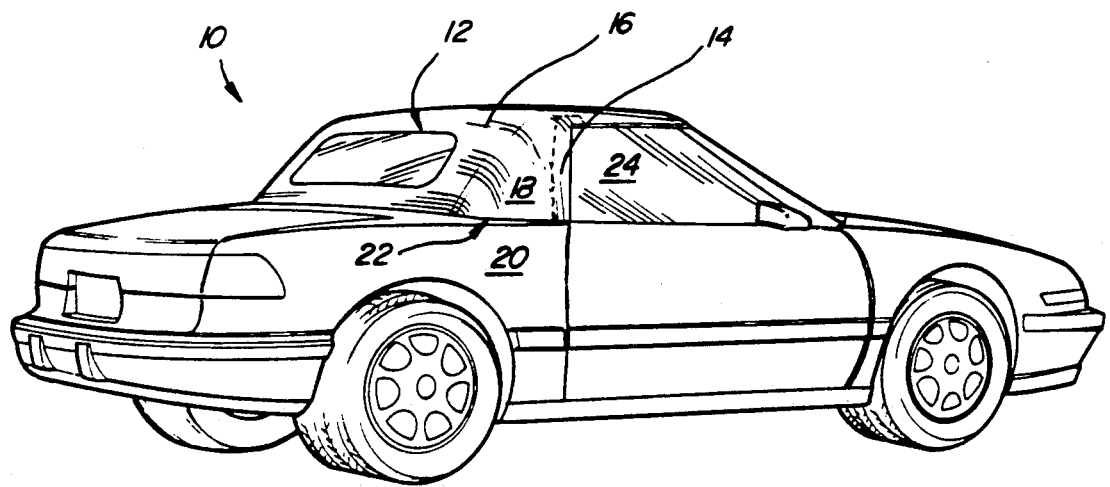
FIG. 1 is a perspective view of the vehicle showing the convertible top outwardly displaced, and therefore tensioned, at a location where the convertible top and a body side panel are adjacent to one another, in accordance with the principles of the present invention.

Referring to the drawings and in particular to FIG. 1, a vehicle 10 having a convertible top 12 in accordance with the principles of the present invention is shown. The convertible top 12 is in an operative raised position with the outwardly displacing member 14 at its most outward position. Accordingly, the pliable covering material 16 is tensioned in the sail panel area 18, and the distance between the covering material 16 in the sail panel area 18 and the body side panel 20 in the quarter belt area 22 is greatly reduced. This defines the exterior finished surface of the vehicle at a location where the body side panel 20 and the convertible top 12 are adjacent one another. Note that the displacing member 14 is generally vertical when the convertible top 12 is in a raised position and is disposed beneath the exterior surface of pliable covering material 16 that is attached to it. The member 14 is disposed adjacent to a rear edge of a side window 24, and has a seal (not shown) attached to it for engagement with this side window 24.

Figure 2:
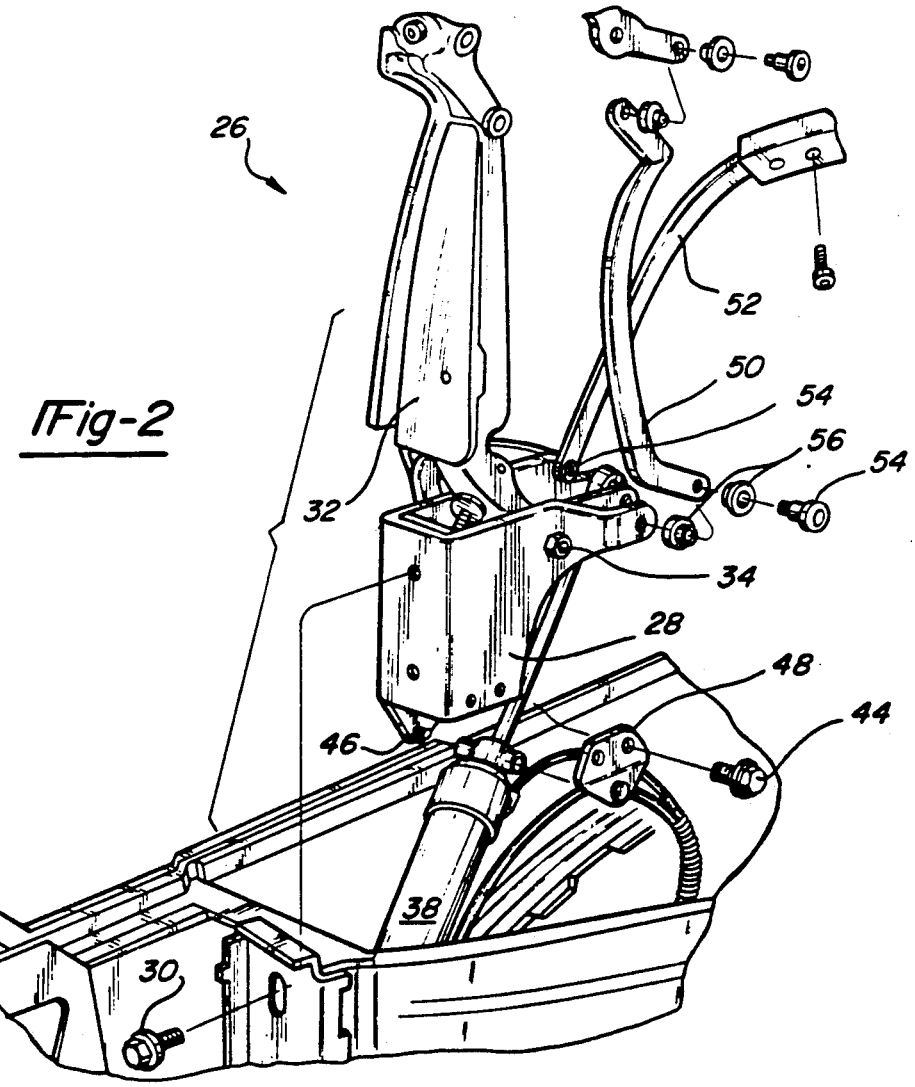
FIG. 2 is an exploded perspective view from the front interior of the vehicle, showing the connection of the passenger side of the convertible top linkage assembly to the body of the vehicle.
Figure 3:
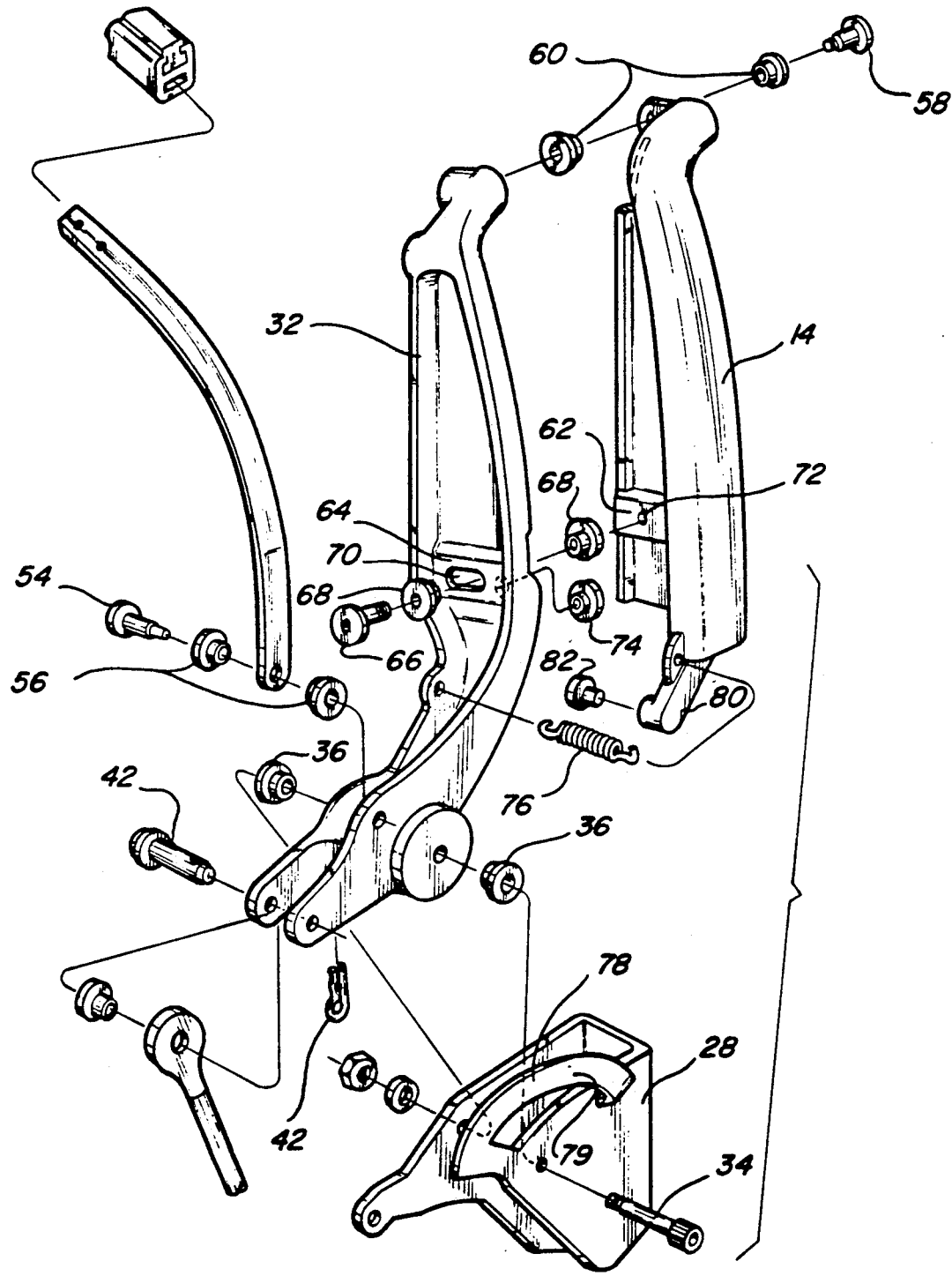
FIG. 3 is an exploded perspective view from the rear exterior of the vehicle, showing the displacing member coupled to a frame member within the passenger side of the linkage assembly and the camming means used to displace the displacing member, in accordance with the principles of the present invention.

As shown in FIGS. 2 and 3, a convertible top linkage assembly 26 in accordance with the principles of the present invention is shown being attached to the passenger side, body of a vehicle 10. A bracket 28 is fixedly attached to the body of the vehicle 10 by at least one bolt 30. A frame member 32 is pivotally attached to this bracket 28 by a threaded fastener 34 and a bushing 36, which are generally horizontal and parallel to the transverse axis of the vehicle 10. An actuator 38 fastened to the body of the vehicle 10 is coupled to a lower portion of this frame member 32 by a pin 40 and cotter key 42. This actuator 38 provides a means for pivotally raising and lowering the frame member 32. The bracket 28 and the actuator 38 are fastened to one another by bolts 44, a pin 46 and a washer like member 48. FIG. 2 further illustrates the pivotable connection of a balance link 50 to the bracket 28; the pivotable connection of a bow member 52 to the frame member 32 is also shown. Conventional pins 54 and bushings 56 are utilized to pivotally connect both the bow member 52 and the balance link 50.

FIG. 3 shows the assembly of the frame member 32, the outwardly displacing member 14 and the bracket 28 in more detail. The outwardly displacing member 14 is pivotally coupled to the frame member 32 with a pin 58 and a bushing 60. This permits the outwardly displacing member 14 to pivot laterally, about a generally horizontal axis that is parallel to a longitudinal axis of the vehicle 10. To better control this lateral motion, an elongated boss 62 on the displacing member 14 engages a corresponding lateral groove 64 in the frame member 32. In addition, a pin 66, in combination with a bushing 68, couples the grooved portion 64 of the frame member 32 to the embossed portion 62 of the displacing member 14. This pin 66 passes through a slot 70 in the frame member 32 and engages with bore 72 in the displacing member 14. Thus, as the displacing member 14 pivots laterally with respect to the frame member 32, its motion is guided by the boss 62 engaging the groove 64, and by the pin's engagement with the slot 70. Note that a pad 74 disposed in the groove 64 provides a smooth surface for the boss 62 to engage. Also note that a tension coil spring 76 extending between the frame member 32 and the displacing member 14 is utilized to bias the displacing member 14 inwardly.

FIG. 3 also depicts the camming mechanism and how it is assembled. The outboard portion of the bracket 28 has an arcuate ramped portion 78 which depends from the main portion of the bracket 28. This arcuate ramped portion 78 is generally concentric with the axis of the threaded fastener 34 that the frame member 32 rotates about. The exterior surface 79 of the arcuate portion 78 ramps outwardly with respect to the vehicle 10 as it extends from a rearward portion of the bracket 28 to a forward portion of the bracket 28. The ramped surface 79 is engaged by a follower 80 that depends from a lower portion of the outwardly displacing member 14. Note that this follower has a pad 82 disposed at its tip for engagement with the ramped surface 79. This reduces wear and allows for smoother engagement between the follower 80 and the ramped surface 79.

Figure 4:
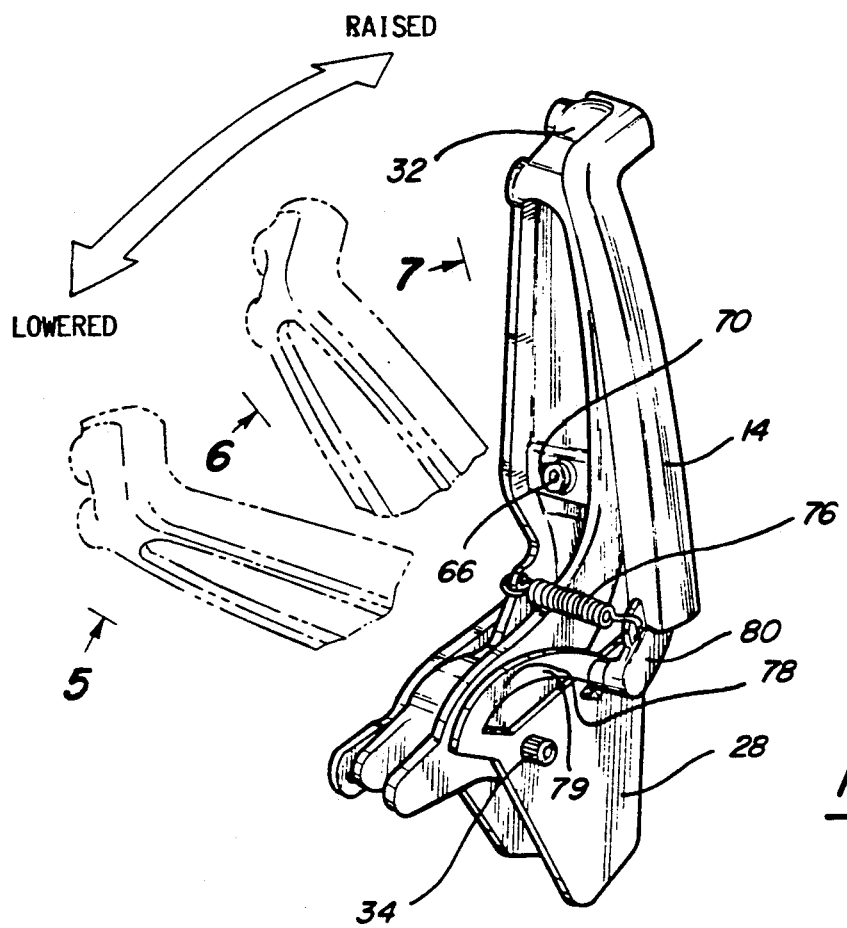
FIG. 4 is a diagrammatic perspective view from the rear exterior of the vehicle, showing the passenger side frame member as the convertible top is being raised, and the displacing member coupled to it engaging the camming means and outwardly displacing in accordance with the principles of the present invention.
Figures 5, 6, 7:
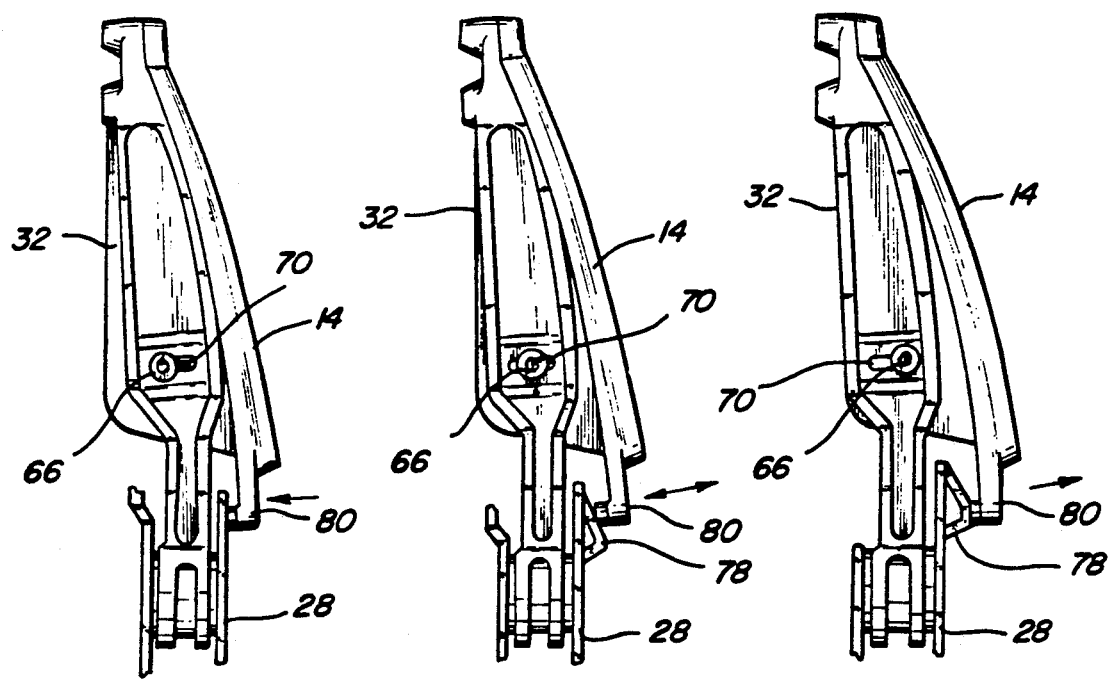
FIG. 5 is a view in the direction of 5 in FIG. 4 showing the displacing member at its most inboard position relative to the frame member, prior to the displacing member engaging the camming means.
FIG. 6 is a view in the direction of 6 in FIG. 4 showing the displacing member engaging the camming means and being outwardly displaced relative to the frame member.
FIG. 7 is a view in the direction of 7 in FIG. 4 showing the displacing member at its most outboard position relative to the frame member, after the displacing member has fully engaged the camming means.

FIGS. 4 through 7 illustrate a method of raising the convertible top 12 to outwardly pivot the displacing member 14. As shown in FIG. 4. when the convertible top 12 is raised, the follower 80 engages with the ramped surface 79. As a result, the displacing member 14 is cammed laterally with respect to the frame member 32 to achieve proper location of the displacing member 14. FIG. 5 shows the displacing member 14 at its most inward position which corresponds to the convertible top 12 being at an intermediate raised position. At this position, the convertible top 12 has been partially raised from its storage position and the follower 80 is about to engage the ramped camming surface 79. FIG. 6 shows the follower 80 engaging the ramped surface 79, thereby pivoting the displacing member 14 outwardly as the convertible top 12 is raised from the intermediate position. FIG. 7 depicts the displacing member 14 at its most outward position which corresponds to the convertible top 12 being in an operative raised position. The same sequence takes place in reverse order when the top is retracted.

To assure constant contact between the follower pad 82 and the ramped camming surface 79, two embodiments are utilized. The preferred embodiment utilizes the tension spring 76 extending between the frame member 32 and the displacing member 14. This spring 76 provides an inward biasing force on the displacing member 14 to hold the follower pad 82 against the camming surface 79. The second embodiment, shown in FIG. 8, utilizes a follower 81 with a forked end 84 that engages both the interior and exterior surfaces of the arcuate ramped portion 78 of the bracket 28. Accordingly, the follower 81 is not allowed to disengage from the arcuate ramped portion 78 as the convertible top 12 is raised and lowered.

While it will be apparent that the preferred embodiment of the invention disclosed is well calculated to provide the advantages above stated, it will be appreciated that the invention is susceptible to modification, variation and change without departing from the proper scope or fair meaning of the subjoined claims.

I claim:

1. For a vehicle convertible top that can be raised into a position to cover the interior of said vehicle, and lowered into a relatively narrow collapsed storage position, an improved means for tensioning pliable covering means comprising (a) a linkage assembly pivotally connected to the vehicle for pivotal movement about a generally horizontal axis that is generally parallel to a transverse axis of the vehicle, said linkage assembly providing a frame for said convertible top and being disposed generally beneath the exterior surface of said pliable covering means;

(b) tensioning means for mechanically tensioning said pliable covering means, said tensioning means having a member pivotally coupled to said linkage assembly such that said member pivots about an axis that is generally horizontal and is generally parallel to a longitudinal axis of the vehicle; and (c) camming means for laterally outwardly displacing a lower portion of said member with respect to said linkage assembly during the raising of said linkage assembly.

2. The convertible top of claim 1, wherein said member is generally vertical when said convertible top is in a raised position.

3. The convertible top of claim 1, wherein said pliable covering means is attached to said member.

4. The convertible top of claim 1, wherein said member is disposed adjacent to a rear edge of a side window.

5. The convertible top of claim 1 wherein said member has a seal attached to an edge of said member adjacent to a rear edge of a side window.

6. The convertible top of claim 1, wherein said member pivots laterally with respect to said vehicle about a generally horizontal axis, generally parallel to a longitudinal axis of said vehicle.

7. The convertible top of claim 1, wherein said member has a follower extending from a lower portion of said member.

8. The convertible top of claim 7, wherein said follower has a forked end for engaging said camming means.

9. The convertible top of claim 1, wherein said camming means is comprised of a ramped surface that forces said member outwardly with respect to said vehicle as said convertible top is raised.

10. The convertible top of claim 1, further comprising a means for biasing said member inward with respect to said vehicle.

11. For a vehicle convertible top that can be raised into a position to cover the interior of said vehicle, and lowered into a collapsed storage position, improved means for positioning pliable covering means with respect to an exterior vehicle body panel, comprising:

(a) a linkage assembly pivotally connected to the vehicle, said linkage assembly providing a frame for said convertible to pa nd being disposed generally beneath the exterior surface of said pliable covering means;

(b) a member coupled to said linkage assembly, said member being coupled such that it can pivot with respect thereto about an axis which is generally horizontal and is generally parallel to a longitudinal axis of the vehicle; and (c) camming means for displacing the lower portion of said member so that a portion of said pliable covering means adjacent said exterior body panel member is displaced relative to said linkage assembly toward said exterior body panel member to reduce the distance between said exterior body panel member and said pliable covering means as said convertible top is raised.

12. The convertible top of claim 11, wherein said member is generally vertical when said convertible top is in a raised position.

13. The convertible top of claim 11, wherein said pliable covering means is attached to said member.

14. The convertible top of claim 11, wherein said member is disposed adjacent to a rear edge of a side window.

15. The convertible top of claim 11, wherein said member has a seal attached to an edge of said member adjacent to a rear edge of a side window.

16. The convertible top of claim 11, wherein said member pivots laterally with respect to said vehicle about a generally horizontal axis, generally parallel to a longitudinal axis of said vehicle.

17. The convertible top of claim 11, wherein said member has a follower extending from a lower portion of said member.

18. The convertible top of claim 17, wherein said follower has a forked end for engaging said camming means.

19. The convertible top of claim 11, wherein said camming means is comprised of a ramped surface that forces said member outwardly with respect to said vehicle as said convertible top is raised.

20. The convertible top of claim 11, further comprising a means for inwardly biasing said member with respect to said vehicle.

21. For a vehicle having a convertible top for covering the interior of said vehicle, improved means for defining the exterior finished surfaces of said vehicle at a location where a vehicle body panel and said convertible top are adjacent one another, comprising:

(a) a linkage assembly pivotally connected to the vehicle, said linkage assembly providing a frame for said convertible top;

(b) pliable covering means for covering said linkage assembly which defines the exterior finished surface of said convertible top;

(c) a frame member within said linkage assembly that moves with said linkage assembly;

(d) means for defining the exterior contour of said convertible to pat a location where a vehicle body panel and said convertible top are adjacent, said means having a second member coupled to said frame member; and (e) camming means for displacing said second member outwardly, relative to said frame member, to a position adjacent said body panel as said convertible top is raised.

22. The convertible top of claim 21, wherein said frame member is generally vertical when said convertible top is in a raised position.

23. The convertible top of claim 21, wherein said second member is generally parallel and adjacent to said frame member.

24. The convertible top of claim 21, wherein said pliable covering means is attached to said second member.

25. The convertible top of claim 21, wherein said second member is disposed adjacent to a rear edge of a side window.

26. The convertible top of claim 21, wherein said second member has a seal attached to an edge of said second member adjacent to a rear edge of a side window.

27. The convertible top of claim 21, wherein said second member pivots laterally with respect to said vehicle about a generally horizontal axis, generally parallel to a longitudinal axis of said vehicle.

28. The convertible top of claim 21, wherein said second member has a follower extending from a lower portion of said second member.

29. The convertible top of claim 28, wherein said follower has a forked end for engaging said camming means.

30. The convertible top of claim 21, further comprising a means for inwardly biasing said member with respect to said vehicle.

31. A method for defining the finished exterior surface of a vehicle convertible top that utilizes an outwardly displacing member coupled to a convertible top linkage assembly, comprising the steps of:

(a) raising said convertible top from its storage position to an intermediate raised position such that said member begins to engage a camming means;

(b) raising said convertible top further from said intermediate raised position, engaging said camming means and outwardly displacing said member with respect to said linkage assembly; and (c) bringing said convertible top to an operative position where it covers an interior of said vehicle.

32. The method of claim 31, wherein said outward displacing of said member tensions a pliable covering means.

33. The method for tensioning the convertible top of claim 32, wherein said outward displacing of said member tensions a sail panel area of said pliable covering means.

34. The method of claim 31, wherein said outward displacing of said member reduces the distance between an exterior body panel and said convertible top.

35. The method of claim 31, wherein said distance between said exterior body panel and said convertible top is a distance between a body side panel and a sail panel area of said convertible top.

36. The method of claim 31, wherein said displacing of said member defines the finished exterior surface of said vehicle in an area where said convertible top is adjacent to a body panel.

* * * * *

UNITED STATES PATENT AND TRADEMARK OFFICE
CERTIFICATE OF CORRECTION

PATENT NO. : 5,106,145
DATED : April 21, 1992
INVENTOR(S) : George A. Corder It is certified that error appears in the above-identified patent and that said Letters Patent is hereby corrected as shown below:

In the Abstract, line 11, "portion" should be -- position --.

Column 1, line 5, after "to" insert -- vehicle --.

Column 2, line 16, "a" should be -- an --.

Column 4, line 64, "to pa nd" should be -- top and --.

Column 5, line 54, "to pat" should be -- top at --.

Signed and Sealed this

Seventh Day of September, 1993

*Attest:*

BRUCE LEHMAN

*Attesting Officer*    *Commissioner of Patents and Trademarks*